DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 9

T946,007

PROCESS FOR COATING FILMS

Roger Sidney Arthur Kelly, Stevenage, and John Robert Wilson, Knebworth, England, assignors to Imperial Chemical Industries Limited, London, England

Filed Mar. 24, 1975, Ser. No. 561,665
Claims priority, application Great Britain, Mar. 29, 1974, 13,991/74; 13,992/74
Int. Cl. H01f *10/02*
U.S. Cl. 428—483
No Drawing. 14 Pages Specification

Magnetic recording materials are produced by coating a plastics film with an aqueous latex or solution comprising (i) one or more polymers or copolymers of one or more of acrylic acid, methacrylic acid, an ester of acrylic acid or an ester of methacrylic acid or (ii) an unhydrolysed or a partially hydrolysed polymer or copolymer vinyl acetate and one or more cross-linking components magnetically susceptible particles. The coating may be applied to a substrate comprising an acrylic or methacrylic acid or ester or a copolyester.